Aug. 10, 1965   J. M. REDFIELD   3,199,388
CUTTING METHOD
Filed June 6, 1962
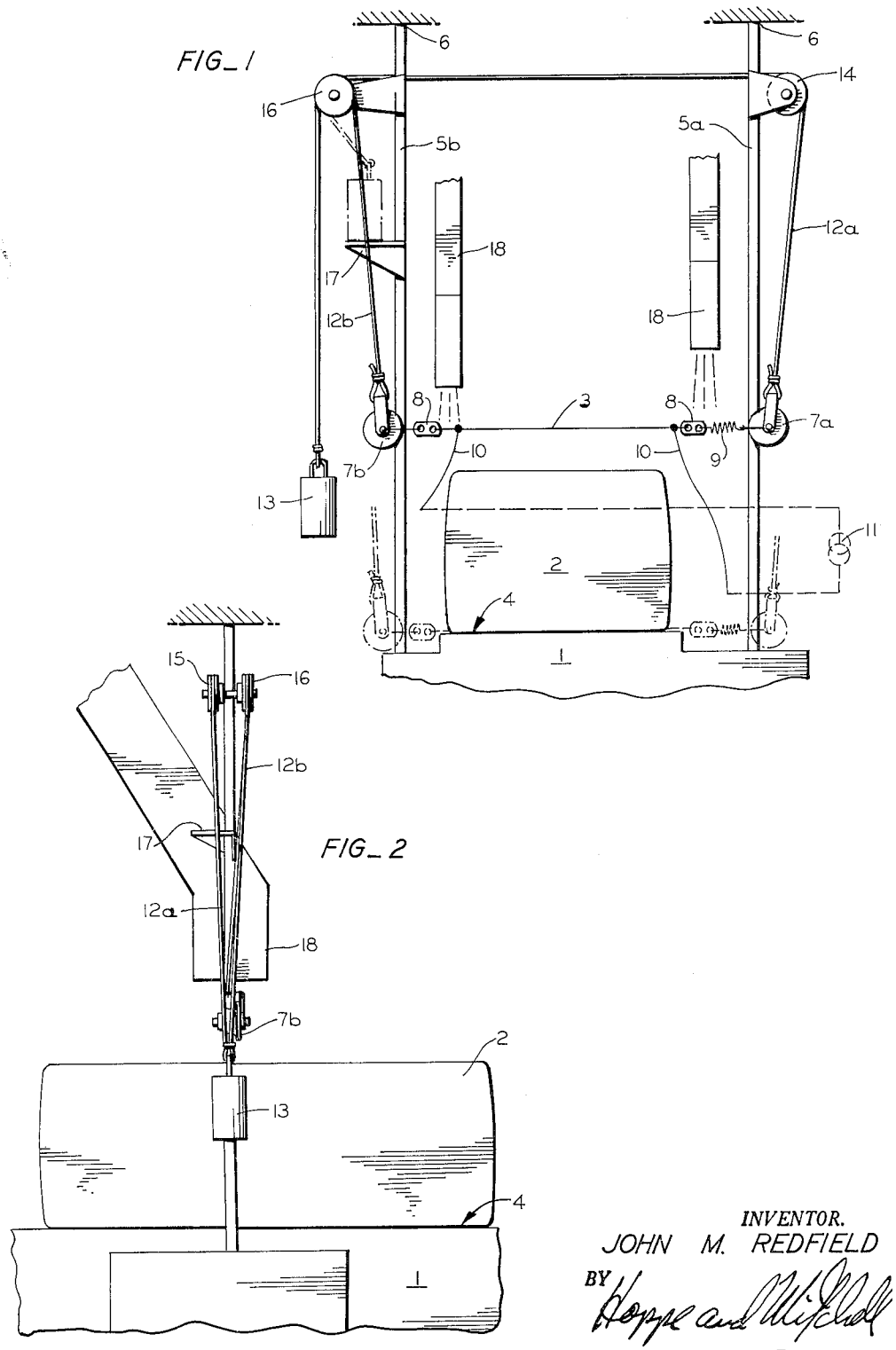

3,199,388
CUTTING METHOD
John M. Redfield, Beverly Hills, Calif., assignor, by mesne assignments, to Califoam Corporation of America, Los Angeles, Calif., a corporation of California
Filed June 6, 1962, Ser. No. 200,567
2 Claims. (Cl. 83—16)

This invention relates generally to methods for shaping and cutting fusible solid materials and relates more particularly to improved cutting methods employing heated cutting means for melting a localized band through the material to severe or shape it.

One object of the present invention is to provide a simple and inexpensive method for cutting fusible solid materials utilizing a minimum of operative man power.

Still another object of the present invention is to provide an improved hot wire cutting method for fusible solid materials having cooling means for prolonging cutting wire life.

One other object of the present invention is to provide an improved method useful for cutting both resilient and rigid fusible solid materials such as urethane forms.

Other objects and advantages of the present invention will become apparent to those skilled in this art upon a consideration of the following description of a specific embodiment of the invention together with the accompanying drawing wherein FIG. 1 is a front elevational view of a selected embodiment of the present invention; and FIG. 2 is a side elevational view of the embodiment illustrated in FIG. 1.

The method of the present invention utilizes cutting means heated to a temperature greater than the melting point of the solid fusible material. The heated cutting means melts a narrow band of the fusible material and by means of externally applied force moves through the material in predetermined directions to shape or cut it. The cutting means applies heat to the fusible material in a narrow band along which the cut is made. The adjacent portions of the material remain intact and unaffected by the applied heat.

The improved method is practiced in cutting apparatus, a form of which is illustrated in FIGS. 1 and 2. The apparatus comprises a base 1 which supports the solid fusible material 2 during the cutting operation. For illustrative purposes the fusible material is shown in the form of a urethane bun. The described apparatus is arranged for severing these buns into shorter lengths for ease of handling.

A heated wire 3 performs the actual cutting. The wire is shiftable relative to the urethane bun 2 and the surface 4 upon which the bun rests. Guide means mounted on the bed control movement of the heated wire 3 with respect to the material being cut. The guide means employed in the apparatus illustrated comprise a pair of tensioned guide rods 5a, 5b each secured at one end to the bed 1 and anchored at the other end as at 6. These guide rods are spaced one on either side of the urethane bun and extend upwardly and transversely with respect to the horizontal surface 4 upon which the bun is supported.

The cutting wire 3 is shiftable along guide rods 5a, 5b. Each end of the wire 3 connects a pulley 7a, 7b or similar element, each of which embraces one guide rod and is shiftable along the rod. In the described embodiment the cutting wire 3 interconnects pulleys 7a, 7b by means of an insulator 8 at each of its ends and spring tensioning means 9 connected to pulley 7a. Spring tensioning means 9 biases the pulleys firmly against the guide rods, yet permits them to roll upon the guide rods as the cutting wire is shifted.

Electric leads 10 connected across a source of electric power 11 provide current to heat the cutting wire above the melting point of the fusible material being cut. A satisfactory cutting wire for cutting flexible urethane foam is fabricated from nickel-chromium alloy wire such as "Nichrome V" sold by Driver-Harris Company of Harrison, New Jersey, having a resistance of about 1.27 ohms per foot. An applied A.-C. voltage of approximately 70 volts develops the necessary cutting temperature in an 80 inch cutting wire.

The cutting wire 3 shifts along guide rods 5a, 5b under the influence of an external actuating means. In the illustrated embodiment a gravity operated means moves the cutting wire upwardly through the urethane bun from a position adjacent surface 4 underneath the bun as illustrated in FIG. 1 in hidden lines. The illustrated actuating means comprises a pair of halyards 12a, 12b connected at one end to one pulley 7a, 7b respectively; trained over guide sheaves; and terminated at weight 13. Halyard 12a trains upwardly over sheave 14 pivotally mounted on one guide rod 5a, trains over sheave 15 pivotally mounted on the other guide rod at the same elevation as sheave 14, and then extends downwardly to a fixed connection on weight 13. Halyard 12b trains upwardly from the other pulley 7b over a sheave 16 mounted on a common axle with sheave 15 and then falls to a fixed connection on weight 13.

Weight 13 normally rests upon platform 17 mounted on guide rod 5b up from the bed 1. The cutting wire then is manually moved to a position adjacent surface 4 and the urethane bun 2 placed over it. Weight 13 then is pushed from platform 17 and the power to cutting wire 3 turned on. As the weight falls, it pulls the cutting wire upwardly and it melts its way through the fusible material. The weight 13 need be little more than that required to shift the cutting wire without any fusible material in place since the melted band of material offers little or no resistance to cutting wire movement. Upon severance of the bun 2, the cutting wire is manually reset and the weight 13 returned to platform 17 ready for the next cut.

Cooling means 18 prolong cutting wire life by cooling those wire extremities which do not contact the fusible material during cutting. This prevents the exposed ends from burning out. It will be apparent that the temperature of the center section of the cutting wire, embraced within the fusible material, is controlled by heat transfer to the cooler mass of fusible material. The temperature of the wire ends exposed to the atmosphere, however, is not so controlled. Thus, a cooling medium, such as an air stream emitted from ducts 18, is directed over the exposed ends of the cutting wire to remove unneeded heat. Normal room temperature air provides effective cooling.

The present invention is effective for cutting both rigid and flexible urethane foams without misshaping the cut ends or binding which often results with other cutting means. Its usefulness for cutting or shaping other fusible materials will be apparent to those skilled in the art. Various structural modifications also will be apparent. For example, actuating means, other than the gravity-manual arrangement described may be used for shifting cutting wire 3; slide means may be substituted for pulleys 7a, 7b; the guide means may be configured to guide the cutting wire in one or more directions during the cut for shaping the fusible material; or the fusible material may be fed into the cutting wire with the wire held in a fixed position. The foregoing detailed description of a specific embodiment of the present invention has been given for clearness of understanding only and no unnecessary limitation should be understood therefrom for these and other modifications will be obvious to those skilled in the art.

I claim:

1. A method of cutting a body of fusible material which comprises, supporting the body of fusible material in a fixed position, arranging a wire along one face of said body to extend thereacross with opposite end portions of the wire projecting beyond opposite sides of said body, heating the wire throughout its length to a temperature greater than the melting point of said fusible material, moving said wire in a guided path through said body to melt a narrow band of said material adjacent the wire in advance of the direction of movement of the wire to cut said material, and directing streams of air over opposite sides of said body in directions substantially at right angles to the length of said wire with the air of each stream moving in a direction opposite to the direction of movement of said wire and over the portions of the wire which project beyond opposite sides of said body and with each air stream in a zone corresponding to the path of movement of said wire whereby the projecting end portions of the wire are subjected to higher velocities of the air streams as the cutting operation proceeds.

2. A method of cutting a body of fusible material which comprises, supporting the body of fusible material in a fixed position, arranging a wire along one face of said body with opposite end portions of the wire projecting beyond opposite edges of said body, heating the wire throughout its length to a temperature greater than the melting point of said fusible material, moving said wire in a direction transversely of its length through said body to melt a narrow band of said material adjacent the wire in advance of the direction of movement of the wire to cut said material, directing streams of ambient air over opposite sides of said body in directions transversely of the length of said wire and over the portions of the wire which project beyond opposite sides of said body to carry heat from the exposed portions of said wire.

References Cited by the Examiner

UNITED STATES PATENTS

| | | | |
|---|---|---|---|
| 2,101,912 | 12/37 | Meyer | 219—221 |
| 2,293,178 | 8/42 | Stocher | 83—16 |
| 2,438,156 | 3/48 | Dodge | 178—5.8 |
| 2,516,609 | 7/50 | Woodard | 83—16 |
| 2,692,328 | 10/54 | Jaye | 83—170 |
| 2,726,706 | 12/55 | Hakomaki | 156—515 |
| 2,957,065 | 10/60 | Bundegaard et al. | 219—221 |
| 2,981,819 | 4/61 | Gregory | 219—385 |
| 2,987,598 | 6/61 | Chace et al. | 83—171 |
| 3,015,600 | 1/62 | Cook | 156—356 |
| 3,087,040 | 4/63 | Van Der Meulen | 156—530 |

FOREIGN PATENTS 571,935   3/33   Germany.

RICHARD M. WOOD, *Primary Examiner.*